US010994382B2

(12) United States Patent
Byström

(10) Patent No.: US 10,994,382 B2
(45) Date of Patent: May 4, 2021

(54) SUPPORT ARRANGEMENT FOR SUPPORTING A WORKPIECE

(71) Applicant: Mattias Byström, Härnösand (SE)

(72) Inventor: Mattias Byström, Härnösand (SE)

( * ) Notice: Subject to any disclaimer, the term of this patent is extended or adjusted under 35 U.S.C. 154(b) by 0 days.

(21) Appl. No.: 15/995,309

(22) Filed: Jun. 1, 2018

(65) Prior Publication Data

US 2018/0345428 A1 Dec. 6, 2018

(30) Foreign Application Priority Data

Jun. 4, 2017 (SE) .................................. 1730152-4

(51) Int. Cl.
| | | |
|---|---|---|
| *B27B 29/00* | (2006.01) | |
| *B23Q 3/00* | (2006.01) | |
| *B23C 3/00* | (2006.01) | |
| *B23Q 3/10* | (2006.01) | |
| *B27B 13/00* | (2006.01) | |

(52) U.S. Cl.
CPC .............. *B23Q 3/002* (2013.01); *B23C 3/005* (2013.01); *B27B 29/00* (2013.01); *B23Q 3/10* (2013.01); *B23Q 2701/02* (2013.01); *B27B 13/00* (2013.01)

(58) Field of Classification Search
CPC .......... B27B 29/00; B27B 13/00; B27C 5/04; B23Q 3/002; B23Q 3/10; B23Q 2701/02; B23C 3/005
See application file for complete search history.

(56) References Cited

U.S. PATENT DOCUMENTS

| | | | | |
|---|---|---|---|---|
| 4,445,264 A | * | 5/1984 | Banerian | B21D 22/04 29/445 |
| 2003/0230180 A1 | * | 12/2003 | Hines | B23D 51/025 83/162 |

* cited by examiner

*Primary Examiner* — Alan Snyder
*Assistant Examiner* — Yasir A Diab
(74) *Attorney, Agent, or Firm* — Patent Portfolio Builders PLLC

(57) ABSTRACT

A support arrangement for supporting a workpiece at a processing device during processing of the workpiece. The support arrangement comprises:
  a fixating means adapted to arrange an abutment surface of the support arrangement in contact with one side of the workpiece when another opposite side of the workpiece abuts one or more fences of the processing device, a locking means adapted to lock the fixating means in a contact position where abutment surface of the support arrangement abuts the one side of the workpiece when another opposite side of the workpiece abuts the one or more fences of the processing device, and
  a connecting means adapted to connect the support arrangement with the processing device.

The support arrangement may be applied e.g. at saw devices for fixating a log to be sawn, in order to achieve a satisfactory result for a sawing process, e.g. planks with a high dimensional accuracy it is important that the workpiece is reliably fixated during the sawing process.

4 Claims, 3 Drawing Sheets

SUPPORT ARRANGEMENT FOR SUPPORTING A WORKPIECE

BACKGROUND

When processing workpieces of various material it is important that the workpieces are reliably fixated and positioned in a processing device. For instance, to achieve a satisfactory result for a sawing process, e.g. planks with a high dimensional accuracy it is important that the workpiece is reliably fixated during the sawing process.

In addition, workpieces like timber logs are heavy and could otherwise give rise to as well injuries of operating persons and damages on the processing devices, e.g. different types of saws. In addition, if the workpiece is not reliably fixated, it may also achieve that the processing device hurts the operator. With known fixating arrangements, there is a problem to reliably fixate both larger and smaller workpieces.

A further problem is to find a convenient solution which minimises risk for damaging processing devices, workpieces and injuring persons.

BRIEF DESCRIPTION OF DRAWINGS

The solution will now be described in more detail by means of exemplifying embodiments and with reference to the accompanying drawings, in which.

DESCRIPTION OF PROPOSED CONCEPT

By the following exemplifying embodiments, a solution which may address at least one of the above defined drawbacks will now be disclosed.

Figure 1:
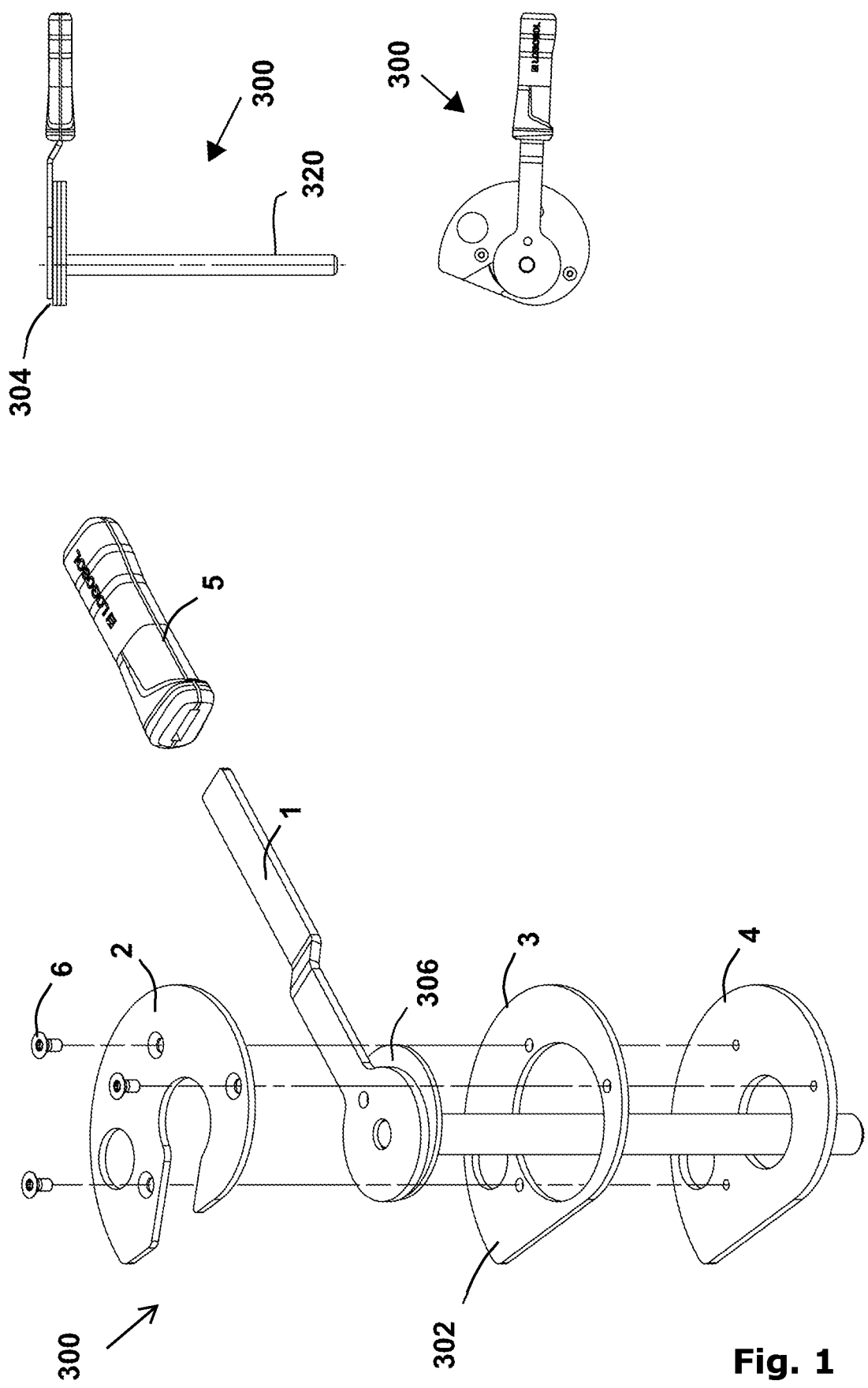
FIG. 1 is a schematic illustration of a support arrangement according to one exemplifying embodiment.
Figure 2:
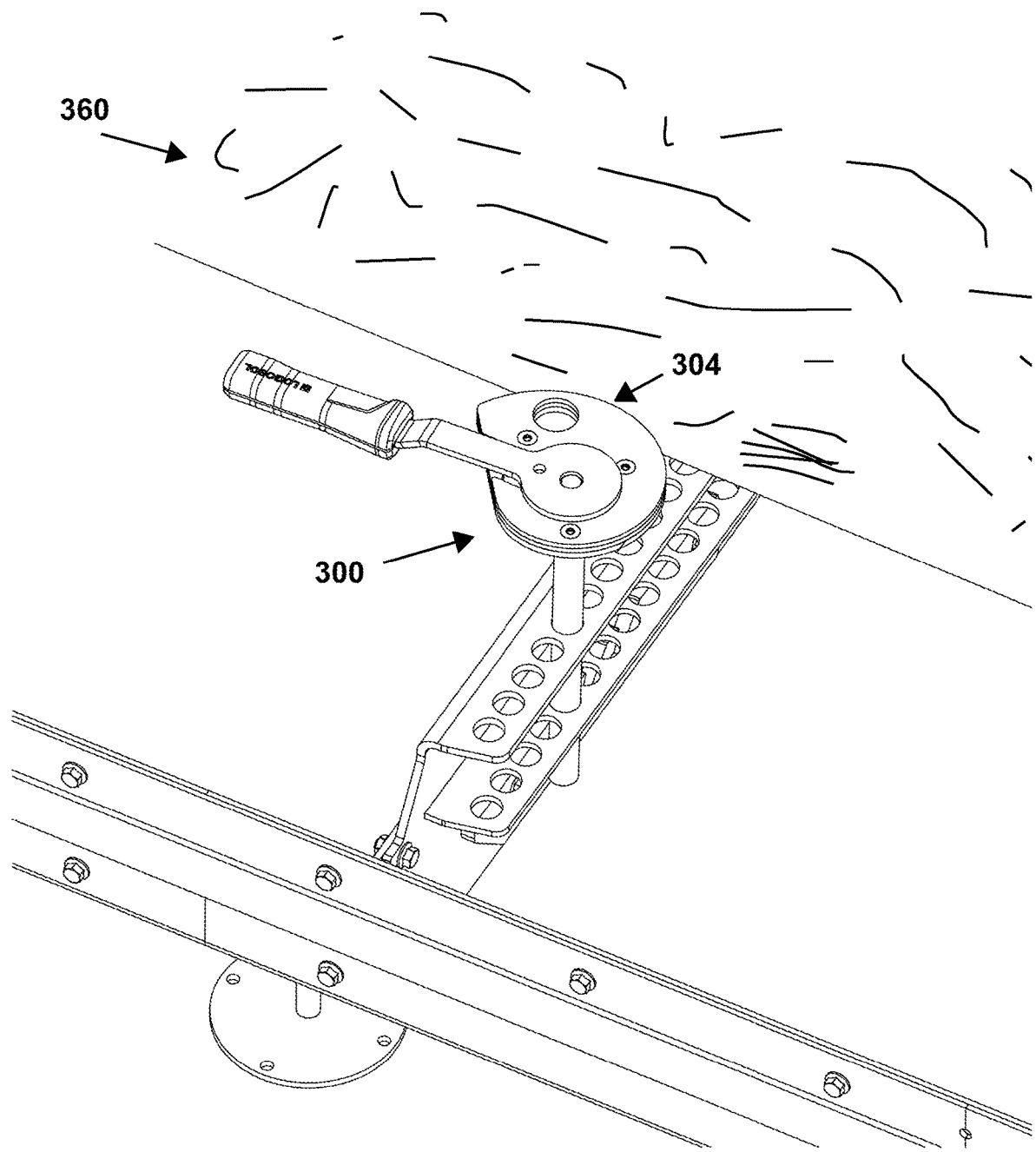
FIG. 2 is a schematic illustration of a support arrangement according to one exemplifying embodiment.
Figure 3:
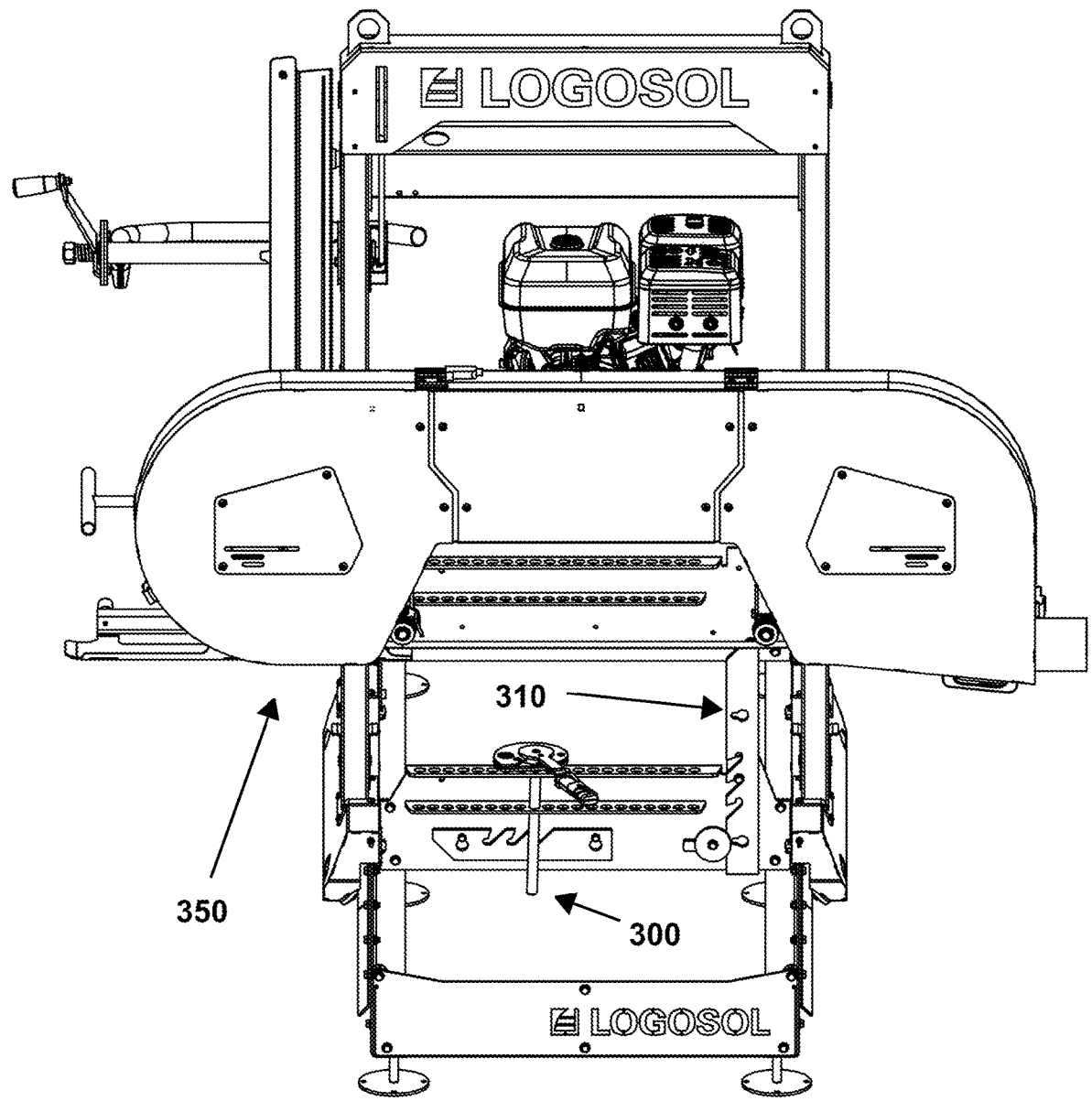
FIG. 3 is a schematic illustration of a processing device with a support arrangement according to one exemplifying embodiment.

With reference to FIGS. 1-3, which are schematic overviews, a support arrangement 300 for supporting a workpiece 360 at a processing device 350 during processing will now be described. In this embodiment, the processing is sawing and the workpiece is a log to be sawn to planks, bars or boards. However, the concept is not limited to sawing as processing, but could also be applied to other types of processing, and other materials than wood.

In FIG. 3, a bandsaw device 350 is illustrated. A workpiece, such as a timber log to be sawn is placed on a rail (not referred to). The workpiece is positioned with one side abutting at least one fence 310, and to be reliably fixated a support arrangement 300 is arranged at the saw device 350, such that it may be operated to press the workpiece towards the fence(s) 310. In FIG. 3, a connecting beam is arranged between and perpendicular to the sides of the rail. The connecting beam has a plurality of holes for receiving the support arrangement 300 at various positions, where each hole corresponds to a position. By inserting the support arrangement 300 into one of the holes, a first rough setting for the width of the workpiece could be made.

It is to be noted that even if the FIG. 3 shows only one support arrangement 300 and one raised fence 310, the concept is not limited to any specific amount of support arrangements 300 and fences 310. Instead, at operation the operator may select to apply any suitable numbers of support arrangements 300 and fences 310 when appropriate to reliably fixate the workpiece.

With reference to FIG. 2, a schematic detail view of a timber log being fixated on a rail of a bandsaw device is illustrated. The timber log is a form of workpiece 360 and the bandsaw device is a form of processing device 350.

Furthermore, in FIG. 2, a support arrangement 300 is shown with a connecting means of the support arrangement inserted in a connecting bar of the bandsaw device. In the FIG. 2, a fixating means is pivoted to abut the timber log. In this embodiment, the fixating means comprises a first excentre which has been pivoted by pulling or pushing the hole clockwise until its body abuts the timber log. The body of the first excentre constitutes than an abutment surface. The hole through the first excentre is manufactured to facilitate gripping when pivoting the first excentre, but alternative gripping facilities may be implemented instead without deviating from the inventive concept, e.g. appropriate handles, knobs, or recesses.

However, the abutment surface may be alternatively implemented within the disclosed concept, e.g. the abutment surface may be implemented as a separate component in order to achieve a larger surface which is in contact with the workpiece. The pivoting of the fixating means is a form of fine setting fixation of the workpiece, which is done after the rough setting of selecting an appropriate hole in the connecting beam has been made. When the fine setting fixation of the workpiece has been done, a further locking means is activated to lock the fixating means in the position set. As will be further described below, the support arrangement 300 comprises a locking means in form of a second excentre, which here is implemented inside the first excentre.

Thus, in an initial action, a rough setting is made by selecting and inserting the connecting means of the support arrangement in an appropriate hole of the processing device, i.e. in the connecting beam.

Then, in a subsequent action, a fine setting is made by pivoting the first excentre until the abutment surface reliably contacts the workpiece, i.e. presses the workpiece towards the fences.

In a following action, the support arrangement is then locked in the position being set by the fine setting. Thereby the workpiece will be reliably fixated, such that processing of it may be made with a more satisfying processing result, e.g. planar surfaces or more uniform thickness of the processed material. In addition, a decreased risk for injuries of operators and decreased risk for damages on the processing device and/or workpiece may also be achieved.

The locking action may be performed by pivoting the second excentre about its own axis, which substantially is parallel with the axis of the connecting means but is shifted with an offset. Thus, the two excentres are in turn pivoted about respective axes that are shifted with respect to each other. When pivoting the second excentre, the abutment surface of the first excentre is then forced from the connecting means towards the workpiece and achieves then a reliable locking of the first excentre. It is to be noted and understood that even if the first excentre and second excentre are pivoted about different not coinciding respective axes, they cooperate. Also, the second excentre could be said being pivoted about the axis of the first excentre, but not with the first excentre's axis in the second excentre's centre.

With reference to FIG. 1, which comprises three schematic views, a support arrangement 300 will now be further described in accordance with one exemplifying embodiment. The figure comprises, an upper view, a side view, and an exploded view.

The support arrangement 300 comprises a fixating means 302, a locking means 306 and a connecting means 320. In this embodiment, the fixating means 302 is implemented as a first excentre, and the locking means 306 as a second excentre. The connecting means 320 is implemented as a rod about which longitudinal axis the fixating means 302 is arranged to be pivoted. The pitch of the first excentre is larger than the pitch of the second excentre. With a combination of two excentres, the larger pitch of the first excentre achieves that the abutment surface 304 may be varied a larger distance, and the smaller pitch of the second excentre achieves that a larger moment is possible to apply in the locking.

Optionally, the first excentre may be widened to implement a larger abutment surface. In FIG. 1, an implementation therefore is illustrated where three elements 2, 3, 4 of the first excentre are to be screwed 6 together. Thereby a thicker first excentre may be achieved which may contribute to a larger abutment surface. Moreover, the second excentre may be provided by a shaft 1 and a handle 5 to improve the moment to be applied and facilitating the pivoting movement.

Regarding the above described exemplifying embodiments, even if the fixating means has been implemented as an excentre with a continuous pitch, i.e. the distance between the abutment surface and the connecting means increases continuously, the inventive concept is not limited thereto. The fixating means may be alternatively implemented without deviating from the inventive concept. For instance, the fixating means may be designed as a polygon with a plurality of abutment surfaces at different distances from the connecting means. Thereby a plurality of larger abutment surfaces at different distances are achieved. With a larger abutment surface the applied force for reliably fixating the workpiece may be spread over a larger area of the workpiece, which may reduce the risk for damaging the workpiece. Such a polygon could e.g. comprise 4 sides with corresponding abutment surfaces distanced 1, 2, 3, and 4 cm, respectively from the connecting means. By such a fixating means, i.e. a polygon with gradually increasing distances between their respective abutment surfaces and the connecting means, an operator may select and set a suitable abutment surface, before pressing the selected abutment surface towards the workpiece by activating the locking means.

The support arrangement according to the above described embodiments may achieve a plurality of advantages, compared to prior known support arrangements. For instance, a single excentre solution may have to be pivoted further after having come in contact with the workpiece in order to achieve reliably fixation. Thereby damaging of the workpiece may be a result.

By instead making use of a double excentre, where the first excentre is pivoted until it abuts the workpiece and thereafter locking the first excentre's position by pivoting the second excentre, the abutment surface does not have to be in rotating contact with the workpiece. Thereby, wear damage of the workpiece may be avoided. Instead, the double excentre achieves a linear pressing movement towards the workpiece, where the inner excentre presses the outer excentre towards the workpiece. I.e. the pivoting of the second excentre results in a press of the first excentre's abutment surface on the workpiece with respect to the connecting means, which position has been fixed when being inserted in the appropriate hole of the connecting beam between the rail sides.

Moreover, it may be easier to find a position where the support arrangement is capable of locking.

Regarding the support arrangement described above in conjunction with some embodiments, even if the contact surfaces of the support arrangement, i.e. surfaces intended to contact the workpiece and surfaces where the fixating means and the locking means are intended to contact each other, are illustrated as smooth in the figures, the inventive concept is not limited thereto. In order to improve fixation or locking capacity further some appropriate contact surfaces may be designed structured, rough, or uneven. Alternatively, any of the contact surfaces may be covered with materials that improves friction, e.g. rubber.

For instance, the outer periphery of the fixating means 302 may be covered or comprise a resilient material such as rubber. Thereby, not only improved fixating is achieved, in addition the workpiece may also be protected from being damaged.

The invention claimed is:

1. A support arrangement for supporting a workpiece at a processing device during processing of the workpiece, the support arrangement comprising:
   a fixating means adapted to be pivoted about an axis of a connecting means to arrange an abutment surface of the support arrangement in contact with one side of the workpiece when another opposite side of the workpiece abuts one or more fences of the processing device, the fixating means comprising a first excentre having a circumference with a varying distance perpendicular to the axis and a first pitch,
   a locking means adapted to lock the fixating means in a contact position where the abutment surface of the support arrangement abuts the one side of the workpiece when another opposite side of the workpiece abuts the one or more fences of the processing device, wherein the locking means comprises a second excentre with a second pitch different than the first pitch and which is adapted to be pivoted about the axis of the connecting means to a lock position wherein the fixating means is locked in the contact position and
   the connecting means is adapted to connect the support arrangement with the processing device and wherein the connecting means extends along the axis.

2. The support arrangement according to claim 1, wherein at least one contact surface of the fixating means or of the locking means is designed structured, rough, or uneven, or wherein the at least one contact surface comprises a resilient material.

3. The support arrangement according to claim 1, wherein the connecting means is a rod, and further wherein the first pitch of the first excentre is greater than the second pitch of the second excentre.

4. The support arrangement according to claim 3, wherein the first pitch of the first excentre is selected to enable a predetermined movement distance of the abutment surface and wherein the second pitch of the second excentre is selected to enable a predetermined locking force of the locking means.

* * * * *